(12) United States Patent
Wilhelm

(10) Patent No.: US 7,532,246 B1
(45) Date of Patent: *May 12, 2009

(54) AUTOMATICALLY POWERING ON AN ELECTRONIC DEVICE SUCH AS A CAMCORDER OR CAMERA BY DETERMINING THE REAL-TIME STATE OF THE ENCLOSURE FOR THE DEVICE

(75) Inventor: Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/147,779

(22) Filed: Jun. 27, 2008

Related U.S. Application Data

(63) Continuation of application No. 12/020,716, filed on Jan. 28, 2008, now Pat. No. 7,406,259.

(51) Int. Cl.
*H04N 5/225* (2006.01)
*H04N 5/232* (2006.01)

(52) U.S. Cl. ..................... 348/372; 348/211.2

(58) Field of Classification Search ............ 340/572.1, 340/572.8; 206/316.2; 348/373, 372, 211.2
See application file for complete search history.

(56) References Cited

U.S. PATENT DOCUMENTS

| | | | |
|---|---|---|---|
| 3,810,217 A | 5/1974 | Natsumoto | |
| 5,519,468 A | 5/1996 | Ohtake | |
| 6,173,119 B1 | 1/2001 | Manico et al. | |
| 7,239,806 B2 | 7/2007 | Chen | |
| 2004/0201772 A1 | 10/2004 | Kobayashi | |
| 2006/0050170 A1* | 3/2006 | Tanaka | 348/360 |
| 2006/0197658 A1 | 9/2006 | Light et al. | |
| 2006/0237626 A1 | 10/2006 | Sakai et al. | |

* cited by examiner

*Primary Examiner*—David Ometz
*Assistant Examiner*—Jason Whipkey
(74) *Attorney, Agent, or Firm*—Carpenter Patent Law; Robert K. Carpenter

(57) ABSTRACT

A system for turning on camera or camcorder power includes a camera or camcorder and an enclosure unattached to the camera or camcorder and suitable for storing and carrying the camera or camcorder, the enclosure having a radio-frequency identification tag sending a wireless signal identifying if the enclosure is closed or at least partially open, and the camera or camcorder having a radio frequency identification tag sensor sensing whether the tag identifies that the enclosure is closed or at least partially; a fastener or a zipper on the enclosure, wherein unfastening the fastener or unzippenng the zipper changes the state of the enclosure from closed to at least partially open; and if the sensor senses that the state has changed to at least partially open; then the power to the camera or camcorder is automatically turned on regardless of the light level inside and outside of the enclosure.

1 Claim, 2 Drawing Sheets

Figure 1:
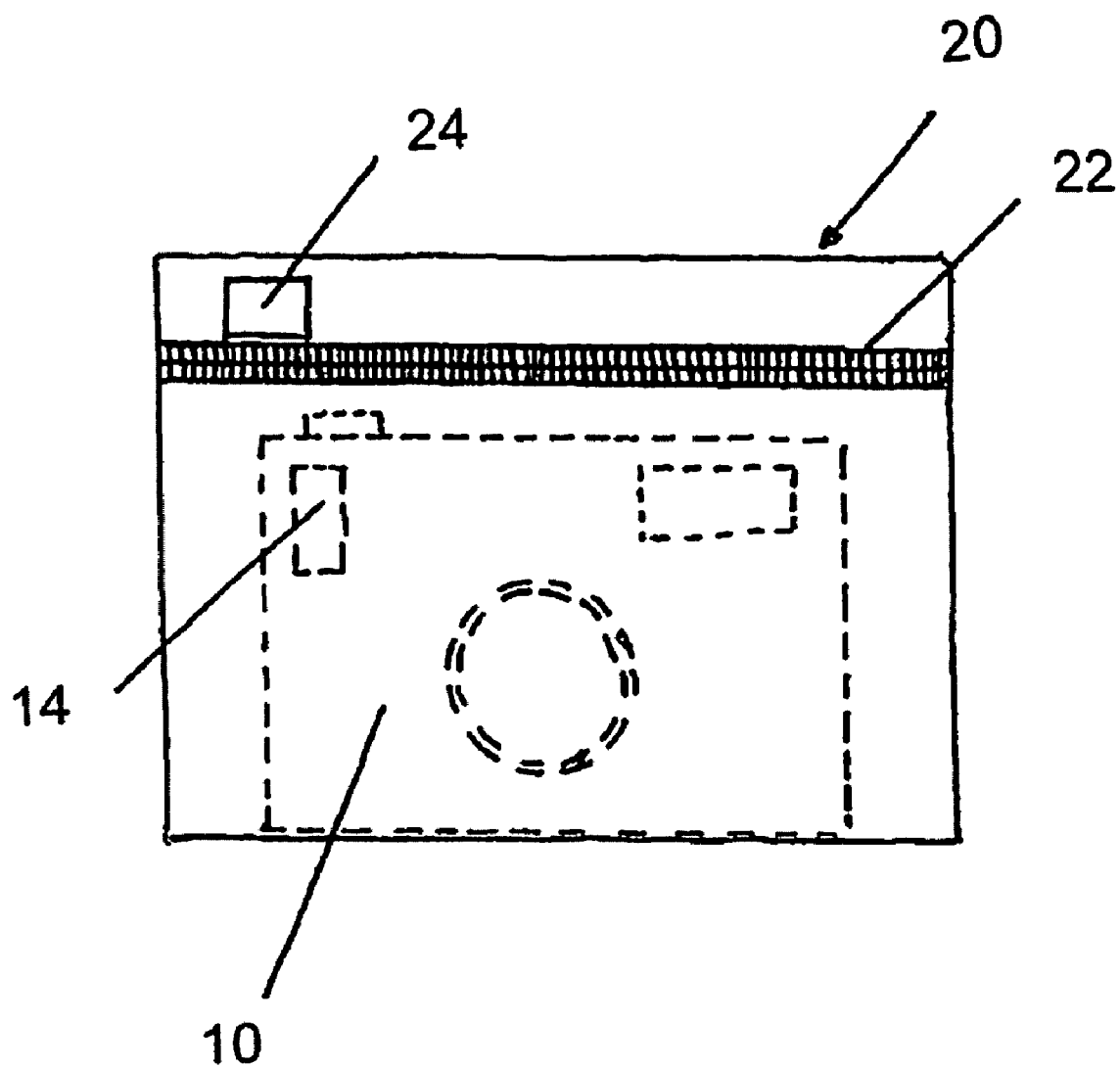

AUTOMATICALLY POWERING ON AN ELECTRONIC DEVICE SUCH AS A CAMCORDER OR CAMERA BY DETERMINING THE REAL-TIME STATE OF THE ENCLOSURE FOR THE DEVICE

CROSS-REFERENCE TO RELATED APPLICATIONS

This application is a continuation of co-pending U.S. patent application Ser. No. 12/020,716, filed Jan. 28, 2008, now U.S. Pat. No. 7,406,259 issued Jul. 29, 2008, entitled "Automatically Powering On an Electronic Device such as a Camcorder or Camera by Determining the Real-Time State of the Enclosure for the Device," which is assigned to the same assignee as this application, and which is hereby incorporated herein by reference in its entirety.

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION (1) Field of the Invention

This disclosure is directed to a system of automatically powering on a camcorder, camera, or similar electronic device by determining the real-time state of the associated enclosure for the device.

(2) Description of Related Art Including Information Submitted under 37 CFR 1.97 and 1.98

Ohtake (U.S. Pat. No. 5,519,468) discloses a photographic camera provided with an automatic preparation function, including a built-in microcontroller and a solar cell provided on an outer surface of the camera, such that an electromotive force generated by the solar cell energizes the microcontroller and thereby makes the camera ready for photographing. No electromotive force is generated by the solar cell when the camera is stored away in the camera case or when the camera is in the dark.

Matsumoto (U.S. Pat. No. 3,810,217) discloses a switch operating mechanism for a photographic camera in which a power source switch is opened by depressing a push button projecting from the camera body and the push button is depressed by a cover of the camera case when the camera body is contained in the camera case.

Chen (U.S. Pat. No. 7,239,806) discloses a sliding cover for switching the power of the camera.

Sakai et al. (U.S. Patent Publication No. 20060237626) discloses a digital camera with the power automatically turned on to activate the digital camera in response to a movement being detected by a sensor that detects a physical movement of the digital camera by an external force.

Kobayashi et al. (U.S. Patent Publication No. 20040201772) discloses an electronic apparatus in which, when a direction sensor senses that the camera body is changed from a vertically laid state to a horizontally laid state or from a horizontally laid stayed to a vertical laid state, a control unit switches on the power source.

Manico et al. (U.S. Pat. No. 6,173,119) discloses a camera having a radio-frequency identification transponder.

BRIEF SUMMARY OF THE INVENTION

This disclosure is directed to a system for turning on the power of a camera or camcorder that includes: a camera or camcorder and an enclosure that is unattached to the camera or camcorder and that is suitable for storing and carrying the camera or camcorder, the enclosure having at least one radio-frequency identification tag that sends a wireless signal that identifies if the enclosure is closed or at least partially open, and the camera or camcorder having a radio frequency identification tag sensor that can sense whether the tag identifies that the enclosure is closed or at least partially open; a fastener or a zipper on the enclosure, where unfastening the fastener or unzipping the zipper changes the state of the enclosure from closed to at least partially open; and if the sensor senses that the state has changed to at least partially open; the power to the camera or camcorder is automatically turned on regardless of the light level inside and outside of the enclosure.

Other exemplary embodiments and advantages of this disclosure can be ascertained by reviewing the present disclosure and the accompanying drawing.

BRIEF DESCRIPTION OF THE SEVERAL VIEWS OF THE DRAWING(S)

Figure 2:
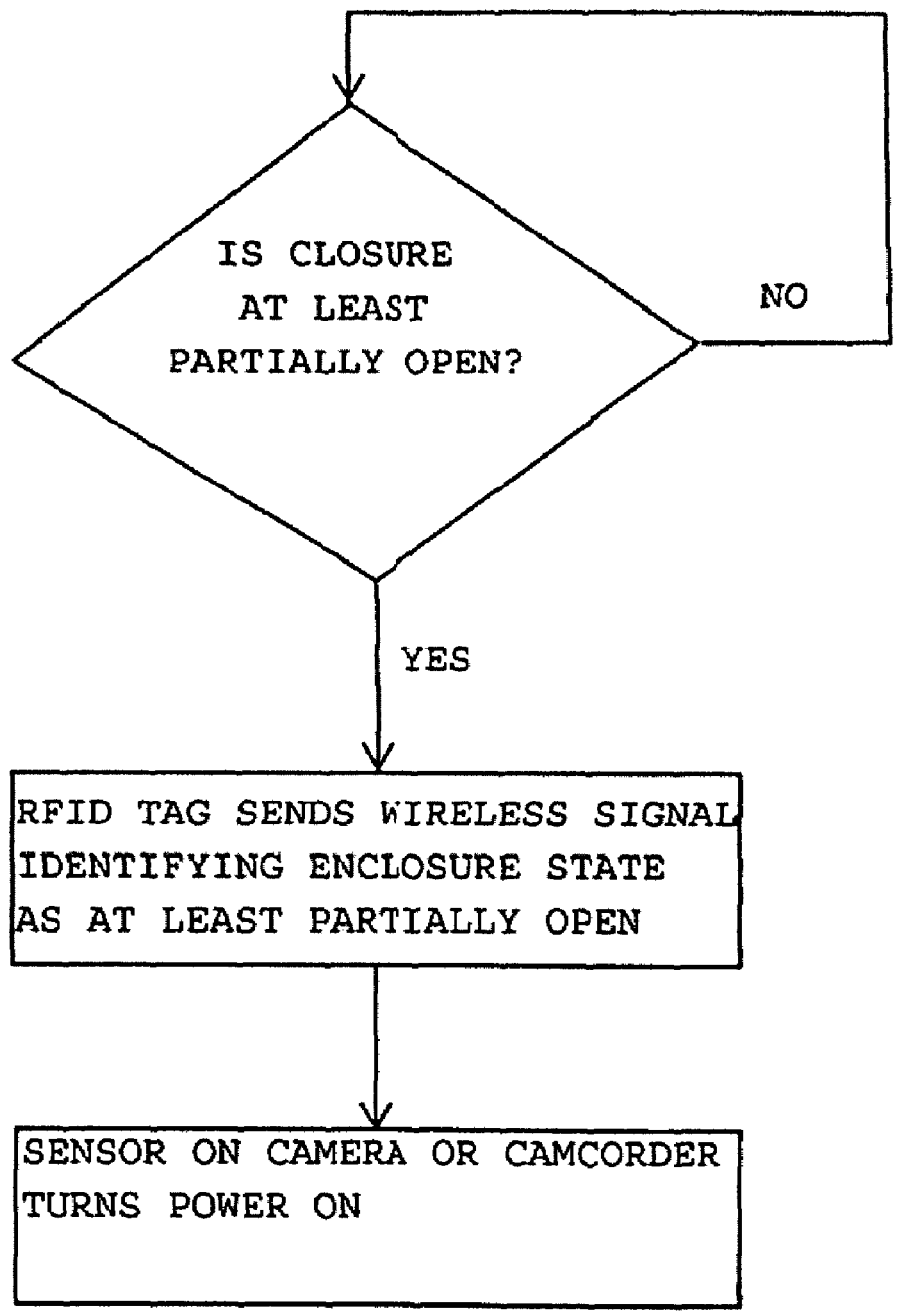

This disclosure is further described in the detailed description that follows, with reference to the drawings, in which:

FIG. 1 shows a camera or camcorder contained in an enclosure according to at least some aspects of this disclosure, and FIG. 2 shows a flowchart illustrating a method according to at least some aspects of the disclosure.

DETAILED DESCRIPTION OF THE INVENTION

Exemplary embodiments of this disclosure are described herein by way of example.

In particular, this disclosure is directed to a method of automatically powering on a camera or camcorder or other electronic device, for example camera or camcorder device 10 shown in the Figure via a wireless signal which is transmitted when an enclosure (carrying case, bag, etc.) 20 associated with the camera or camcorder 10, or other device is open or in the process of being opened (at least partially open).

This disclosure can address the problem of the need to wait for a camera or camcorder device to power on after the photographer or videographer has removed the device from its carrying case and manually turned the device to an ON state.

This method can save seconds off of the typical manual startup time and can allow the photographer/videographer the opportunity to record an image or footage that otherwise might be missed because of the device startup delay in addition to the action of the photographer/videographer manually turning the device to an ON state.

This method can overcome the limitations of using light sensors to automatically turn on a camera if there is light present, since the present method can address possible circumstances where there may be minimal to zero lighting.

Previously, valuable picture or video footage opportunities can be missed in part or whole because of the time it takes to remove a camera or camcorder from its case, the added time to manually turn the device on, and then the need to wait for one to several seconds for the device to be ready to operate.

The method and system of this disclosure can shorten this timeframe by automatically powering on the camera or camcorder 10 while it is still in, or in the process of being removed from, the camera case 20.

Aspects of this invention can work with a radio-frequency identification (RFID) for communication between the case 20 and the camera/camcorder 10, an RFID chip or sensor 14 for sensing the state of an RFID chip or tag device 24 on the enclosure 20 in order to determine a state change on the enclosure 20, for example, determining whether a closure has been opened or at least partially opened, for example determining if zipper 22 has been unzipped (or at least partially unzipped) or a button unbuttoned, and a system can be resident on the camera/camcorder 10 capable of powering on the camera/camcorder 10. In at least some embodiments, the system for powering on the camera/camcorder 10 can be a software system resident on the camera/camcorder 10, and in at least some embodiments can have logic which would further enhance operation of the camera/camcorder 10, for example, not extending a barrel lens until the lens is unobstructed.

The method and system of this disclosure, in contrast to a light-sensing solution, does not rely on an external influence to operate and can function regardless of the presence or absence of light. The method and system of this disclosure also can provide a quicker startup time since it can begin the powering-on process prior to the case being fully opened and/or prior to the device being taken out and exposed to a light source.

In some embodiments, the RFID chip or tag device 24 in the case 20 can be an active tag and sensor that can be incorporated into the camera/camcorder case 20:

1. Camera of camera case 20 incorporating this invention is opened (unzipped, unbuttoned, or other method by which a change can be sensed).

2. RFID chip or tag device 24 senses or receives input from a separate sensor or tag that the case 20 is being opened. Various methods could be used to determine the opening action including magnetic sensors, circuit loop conductivity, or other means and/or apparatus.

3. The RFID chip or tag device 24 transmits a message declaring the closed state of the case 20 has changed to an opened (or at least partially opened) state.

4. The RFID chip or sensor 14 on the camera or camcorder 10 (or other related wireless communication method) receives the message from the camera case 20 and initiates an automatic power-on method.

5. During or after the automatic power-on, optional methods on the camera or camcorder 10 can be run as needed. For example, because the camera or camcorder device 10 was powered on automatically, the device might assume it is still contained within the camera case 20 and therefore should not extend the barrel lens until another condition has been met. Examples of an additional condition might include the user pressing a button, a light sensor, removal of a lens cap, or other means or apparatus.

6. The user retrieves the camera or camcorder 10 from the case 20 already powered on and ready for use.

In other embodiments, the RFID chip or tag device 24 on the case 20 can be a passive RFID chip and sensor that can be incorporated into the camera/camcorder case 20:

1. In such embodiments, the camera or camcorder 10 can utilize a method of interrogating the RFID chip incorporated into the camera case 20.

2. The RFID chip or other wireless communication method within the camera or camcorder 10 interrogates the RFID tag incorporated into the enclosure continuously or intermittently.

3. If the state of the camera case 20 closure 22 has not changed as determined by sensing methods (magnetic, circuit, etc.), the state of the passive RFID chip or tag device 24 does not change, the interrogation response is the same, and no further action is taken.

4. If the state of the camera case 20 closure has changed as determined by sensing methods (magnetic, circuit, etc.), the state of the passive RFID chip or tag device 24 changes and the response to the interrogation notes the state of the camera case 20 has changed from closed to open. The RFID chip or sensor 14 on the camera or camcorder 10 (or other wireless communication apparatus) receives the message from the camera case 20 and initiates an automatic power-on method.

5. During or after the automatic power-on, optional methods on the camera or camcorder 10 can be run as needed. For example, because the device 10 was powered on automatically, the device 10 might assume it is still contained within the camera case 20 and therefore should not extend the barrel lens until another condition has been met. Examples of an additional condition might include the user pressing a button, a light sensor, removal of lens cap, or other means or apparatus.

6. The user retrieves the camera or camcorder 10 from the case 20 already powered on and ready for use.

In at least some embodiments, the camera or camcorder 10 can be programmed to only respond to automatic power on requests from a specific case 20 and/or RFID chip or tag device 24.

In some embodiments of this disclosure, the closure can be a closure snap that can be a binary switch with a sensor output that notes two conditions: either the snap can be fastened (circuit is unbroken) or the snap is unfastened (circuit is broken). The circuit can be made up of the metal snap itself, or a metal connector implemented into both sides of the snap, and connectivity to a small battery. There is no action if the circuit is unbroken. When the snap is unfastened, breaking the circuit, the switch activates the RFID tag which causes the RFID tag to transmit identification data. An RFID on the camera or camcorder receives the transmission and either uses the transmission alone as a reason to power on the device, or compares the identification data with the user programmed data on the camera to determine if the power on transmission was intended for the device. The latter situation enables the user to correlate their camera or camcorder with their case so that the actions of others with a similar case will not affect their equipment.

In some embodiments of this disclosure, a case can utilize a magnet as the closure device or as an attached part of the closure device and a Hall effect probe. The Hall effect probe determines the state of the closure and activates the RFID tag if the enclosure is in an open state as described above.

In some embodiments where a zippered case is utilized, in at least some embodiments, a conductive material attached to the zipper 22 or as a part of the zipper 22 near the point where the zipper 22 begins to unzip can be utilized. When the zipper 22 pull tab and/or the zipper slide, which can be adapted to perform the conductivity task, is drawn across this area, it can complete a circuit that can be utilized as sensor input to activate the RFID chip or tag device 24 and follow on activity as described above.

In at least some embodiments, an optional pressure sensor can be incorporated into the case 20 such that a power on signal is only sent when the camera or camcorder 10 is in the case 20. This can prevent a powered off device 10 from being turned on prior to being put back in the case 20 if the case 20 had been closed and then re-opened.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A system for turning on the power of a camera or camcorder, comprising:

a camera or camcorder and an enclosure that is unattached to the camera or camcorder and that is suitable for storing and carrying the camera or camcorder, the enclosure having at least one radio-frequency identification tag that sends a wireless signal that identifies if the enclosure is closed or at least partially open, and the camera or camcorder having a radio frequency identification tag sensor that can sense whether the tag identifies that the enclosure is closed or at least partially open;

a fastener or a zipper on the enclosure, wherein unfastening the fastener or unzipping the zipper changes the state of the enclosure from closed to at least partially open;

and if the sensor senses that the state has changed to at least partially open; then the power to the camera or camcorder is automatically turned on regardless of the light level inside and outside of the enclosure.

* * * * *